(12) United States Patent
Kreuzer

(10) Patent No.: US 6,994,813 B2
(45) Date of Patent: Feb. 7, 2006

(54) METHOD OF FOAM-COATING CABLES AND FOAMING TOOL

(75) Inventor: Martin Kreuzer, Kleinwallstadt (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 308 days.

(21) Appl. No.: 10/279,455

(22) Filed: Oct. 24, 2002

(65) Prior Publication Data
US 2003/0080455 A1 May 1, 2003

(30) Foreign Application Priority Data
Oct. 25, 2001 (DE) ................................ 101 52 719

(51) Int. Cl.
*B29C 44/06* (2006.01)
*B29C 44/12* (2006.01)

(52) U.S. Cl. ................ 264/46.4; 264/46.7; 264/271.1; 264/276; 264/278

(58) Field of Classification Search ............... 264/46.4, 264/46.7, 276, 278
See application file for complete search history.

(56) References Cited

U.S. PATENT DOCUMENTS 5,072,093 A * 12/1991 Scheuerer .................... 219/204
6,086,037 A *  7/2000 Nagy et al. .................... 249/91

FOREIGN PATENT DOCUMENTS

| DE | 3643398 A1  | 6/1988  |
| DE | 1993189 A1  | 1/2001  |
| DE | 19937000 A1 | 2/2001  |
| EP | 0105535 A1  | 4/1984  |
| EP | 0286249 A2  | 10/1988 |
| FR | 2789353     | 8/2000  |

* cited by examiner

Primary Examiner—Allan R. Kuhns
(74) Attorney, Agent, or Firm—Tarolli, Sundheim, Covell & Tummino L.L.P.

(57) ABSTRACT

A method of foam-embedding cables, in particular for foam-embedding a steering wheel skeleton which is equipped with cables, comprises the following steps: the cable is positioned in a foaming mold; a portion of the cable, which is not to be embedded in foam, is positioned in a resealable cavity provided in the foaming mold, the cavity being sealed against the ingress of foam; the cavity and the foaming mold are closed; the foaming mold is filled with foam; and the foaming mold and the cavity are opened to remove a product produced. There is also proposed a foaming tool for performing such method.

10 Claims, 2 Drawing Sheets

METHOD OF FOAM-COATING CABLES AND FOAMING TOOL

TECHNICAL FIELD

This invention relates to a method for foam-embedding of cables, in particular for foam-embedding a steering wheel skeleton equipped with cables. The invention also relates to a foaming tool for performing the method.

BACKGROUND OF THE INVENTION

Especially in automotive engineering, and here in particular in the field of passenger compartment coverings or steering wheels, there are frequently used components which have both portions made of a foamed or injection-molded plastic material and electric or electronic components with the associated cables and plugs. The electric lines can subsequently be mounted in the finished foamed component, if guiding passages have been left by the foaming tool. However, this method often involves much work, as after the foaming process another working step must be performed. In certain cases, for instance when using foam-coated switches or heating mats for a steering wheel heating, the electric leads must also be foam-coated at least in part. In this case, the electric connecting lines have so far either protruded from the foaming mold (when closing the mold, care must be taken to avoid a damage of the cable or the plug housing) or they are foam-coated as well, where after the foaming process a plug must be liberated from foam and be cleaned with much effort. Therefore, to shorten the required working time and to avoid damages of the components during manufacture, there is a need of a simple method of foam-embedding cables.

BRIEF SUMMARY OF THE INVENTION

The proposed method of foam-embedding cables, in particular for foam-embedding a steering wheel skeleton which is equipped with cables, comprises the following steps: the cable is positioned in a foaming mold; a portion of the cable, which is not to be embedded in foam, is positioned in a resealable cavity provided in the foaming mold, the cavity being sealed against the ingress of foam; the cavity and the foaming mold are closed; the foaming mold is filled with foam; and the foaming mold and the cavity are opened to remove a product produced. Thus, the portion of the cable which is not to be foam-coated does not lie between the halves of the foaming mold, but is disposed in the interior of the foaming mold. Since it is disposed in a cavity which is sealed against the ingress of foam, this cable portion does not get in contact with foam. The cavity is arranged such that upon opening the cavity and the foaming mold, the product can easily be removed.

The method is particularly advantageous if the portion of the cable is provided with a plug or switch to be positioned in the cavity. In this case, the cable can be preassembled completely before the foaming process.

The cable can also be mounted on a carrier member to be foam-coated as well and can be positioned in the foaming mold together with the carrier member. By means of the foaming process, the attachment of the cable can thus be effected at the same time.

Preferably, the carrier member is a steering wheel skeleton. The method is particularly useful for the safe and easy assembly of a steering wheel heating. In this case, an electric lead extending from the steering wheel rim can be introduced e.g. into the hub region of the steering wheel, where it can be connected with the corresponding electronics via a plug. The cable is preferably either guided along the spoke and foam-coated together with the same or foam-coated in a wall of the hub pot of the steering wheel. In both cases, the plug is placed in the cavity such that it does not get in contact with the foam. Upon removal of the steering wheel from the foaming mold, it is merely necessary to insert the electronics and connect the plug with the electronics.

The method can also be used for producing passenger compartment cladding parts, such as instrument panels.

The method is preferably performed in a foaming tool, comprising a hollow foaming mold which defines an inner chamber to be filled with foam and has a resealable cavity adjoining the chamber and sealed against the ingress of foam, at least one passage being provided between the cavity and the chamber, through which passage the cable can be introduced into the cavity.

Preferably, the cavity is delimited against the chamber by means of a lid, and a preferably spring-mounted holding-down device is provided at the foaming mold, which with the foaming mold closed, presses against the lid such that the same closes the cavity. Such arrangement allows to easily close the cavity and reopen the same for removing the product.

In a preferred embodiment, the cavity is provided in a foaming core of the foaming tool. In this way, in particular in the case of a vehicle steering wheel, the plug can be arranged in the vicinity of a cavity which in any case must be kept clear for accommodating a gas bag module.

In the passage, there is preferably disposed a seal for sealing the chamber against the ingress of foam.

In a preferred embodiment, a groove that is open towards the chamber is provided in the foaming tool adjacent the passage for accommodating the cable. This arrangement allows to foam-coat a large part of the cable, whereas e.g. a plug remains free of foam and movable.

DETAILED DESCRIPTION OF THE PREFERRED EMBODIMENT

The method according to the invention will subsequently be described by means of the example of a vehicle steering wheel. However, the method can also be used for producing any other products containing foam-coated cables.

Figure 1:
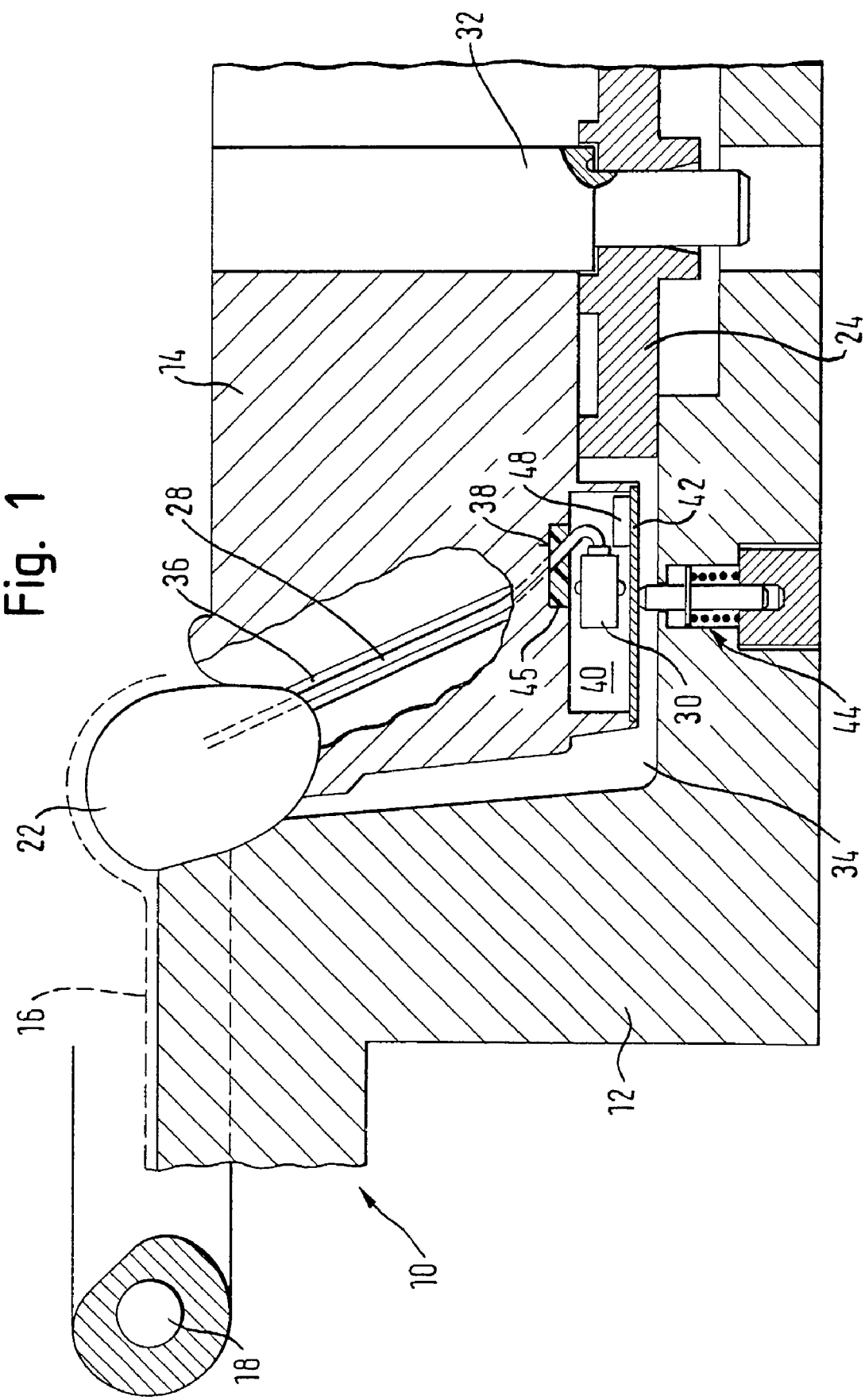
FIG. 1 shows a schematic section through a foaming tool according to the invention.

FIG. 1 shows a foaming tool 10 the foaming mold of which has an outer shell 12 as well as a core 14. The foaming mold can be closed by a lid shell 16, which is only indicated in FIG. 1.

Figure 2:
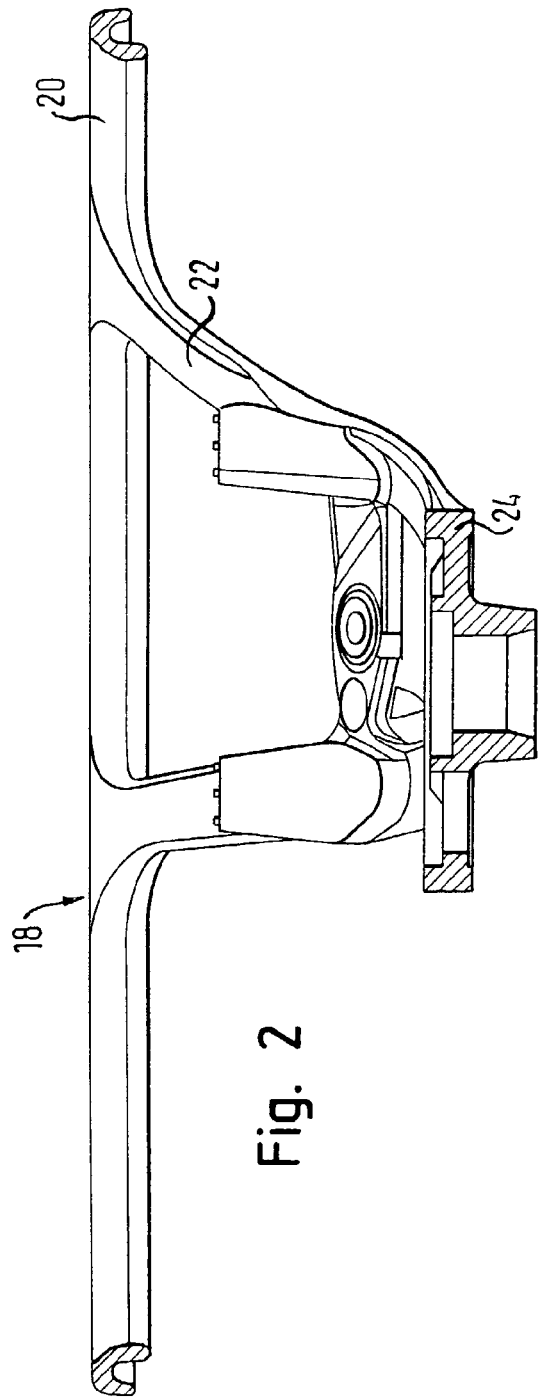
FIG. 2 shows a schematic view of a steering wheel skeleton.

The foaming tool 10 is used for foam-embedding a steering wheel skeleton 18 (FIG. 2). The skeleton 18 has a rim portion 20, a plurality of spoke portions 22 as well as a hub portion 24. Hub portion 24 and rim portion 20 are connected via the spoke portions 22. The skeleton 18 may be fabricated in a known manner, e.g. by an aluminum die casting method.

In the example illustrated, the rim portion 20 is provided with a steering wheel heating 26 (indicated in FIG. 3), the electric supply cable 28 of which ends in a plug 30.

For foam-coating, the steering wheel skeleton 18 is inserted in the lid shell 16 of the foaming mold, centering and positioning of the skeleton 18 in the tool being achieved via a carrier 32. The carrier 32 is also used for centering the core 14 which has now been inserted. Between the outer shell 12 and the core 14 an inner chamber 34 has now been formed, in which during the subsequent foaming process a hub pot 35 of the steering wheel is obtained. In this hub pot 35 for instance a gas bag module (not shown) can then be accommodated.

In its wall directed towards the inner chamber 34, the core 14 has a groove 36 which is open towards the inner chamber 34. In the example illustrated, the groove 36 extends from a point at which the spoke portion 22 gets in contact with the core 14, the so-called spoke inlet, along the wall of the core 14 towards the lower end of the core in the vicinity of the hub portion 24. At the end remote from the spoke inlet, the groove 36 opens in a passage 38 formed in the core 14. The passage 38 connects the groove 36 with a cavity 40. The cavity 40 is formed by a recess in the core 14 which is open towards the inner chamber 34 and can be closed by a separate lid 42.

The lid 42 is kept closed by a spring-mounted holding-down device 44. The holding-down device 44 is disposed in the outer shell 12 of the foaming tool 10 and can be actuated from outside the foaming tool 10. During the foaming process, the holding-down device 44 holds the lid 42 firmly pressed-on, so that the cavity 40 is closed and sealed against the ingress of foam.

The cable 28 is inserted in the groove 36 such that the plug 30 comes to lie in the cavity 40. The cable 28 runs through the passage 38, in which a seal 45 ensures that the cavity 40 is sealed against the ingress of foam from the groove 36. Useful seals include ordinary and known two-part rubber seals.

During the subsequent foaming process, the inner chamber 34 is filled with plastic foam 46, preferably PUR foam, which also penetrates into the groove 36 and by which the cable 28 extending therein will be embedded. In this way, the cable 28 is connected with the wall of the hub pot 35 formed in the inner chamber 34. The foam 46 is kept back by the seal 45 in the passage 38 and by the lid 42, so that the chamber 40 remains free of foam. The cable 28 can withstand the conditions existing during the foaming operation in the order of 115° C. and 7 bar without being damaged.

When the plastic foam 46 has solidified, the holding-down device 44 is released and the cavity 40 is thus opened. Subsequently, the mold is opened, so that the core 14 can be removed. Now, the foam-coated skeleton 18 can be removed from the foaming tool 10, the lid 42 being left in the interior of the hub pot 35 now formed. The lid 42 can then be removed and be reused in the next foaming process.

Figure 3:
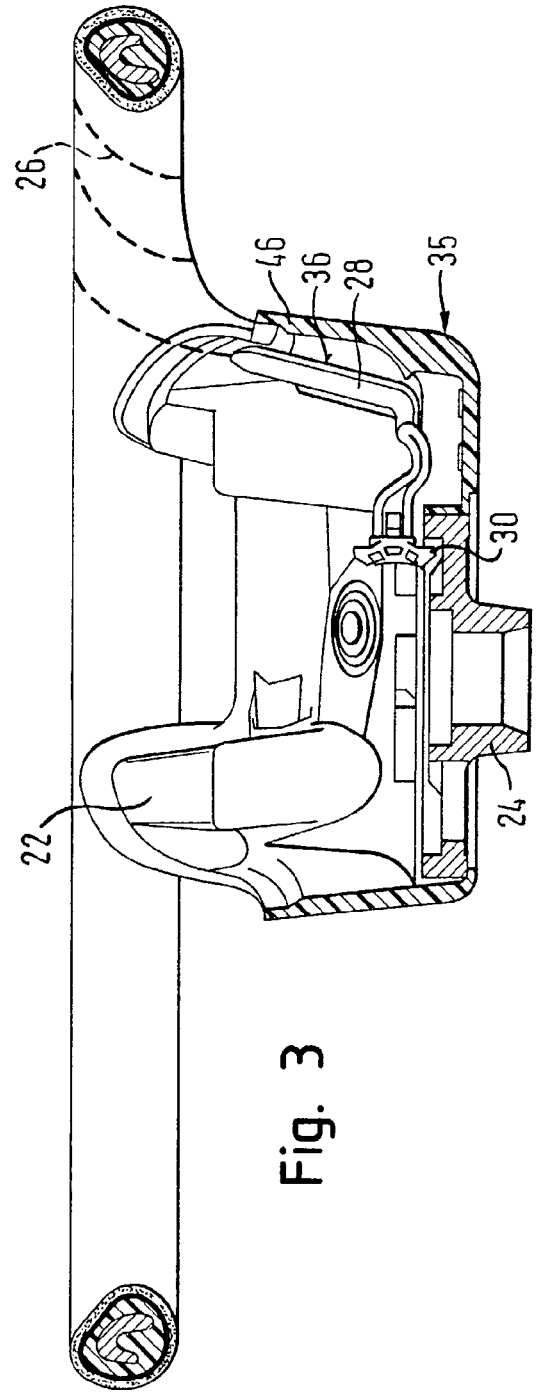
FIG. 3 shows a schematic view of a steering wheel with a steering wheel heating, which was produced by a method according to the invention.

Except for the plug 30 and a short portion extending from the plug through the passage 38, the cable 28 is foam-coated in the wall of the hub pot and thus protected against inadvertent damages (see FIG. 3, where the nut 36 is shown in a cutout view for reasons of clarity).

The depression in the hub pot 35, which corresponds to the former cavity 40, can be used to accommodate an electronic component 48, e.g. for the steering wheel heating 26. The electronic component 48 can simply be connected with the plug 30.

It is also possible to design the nut 36 such that one of the spoke portions 22 is accommodated therein together with the lead 28.

What is claimed is:

1. A method of foam-embedding a steering wheel skeleton which is equipped with a cable, said method comprising the steps of:
    a) mounting said cable on said steering wheel skeleton;
    b) positioning said steering wheel skeleton with said cable in a foaming mold;
    c) positioning a portion of said cable, which is not to be embedded in foam, in a resealable cavity provided in said foaming mold;
    d) sealing said cavity against an ingress of foam;
    e) closing said cavity and said foaming mold;
    f) filling said foaming mold with foam; and
    g) opening said foaming mold and said cavity to remove said foam-embedded steering wheel skeleton from said foaming mold and said portion of said cable from said cavity.

2. The method as claimed in claim 1, wherein said portion of said cable is provided with one of a plug and a switch to be positioned in said cavity.

3. The method as claimed in claim 1, wherein said cavity leaves a space in said foam-coated steering wheel skeleton, a component being positioned in the space.

4. The method as claimed in claim 1, wherein said cable is mounted on a carrier member which is to be foam-coated as well and wherein said cable together with said carrier member are positioned in said foaming mold.

5. The method as claimed in claim 4, wherein said carrier member is a steering wheel skeleton.

6. The method as claimed in claim 1, wherein said cavity is closed by a lid.

7. The method as claimed in claim 6, wherein a holding-down device is provided to press against said lid to close said cavity.

8. The method as claimed in claim 7, wherein said holding-down device is spring-mounted.

9. The method as claimed in claim 1, wherein said foaming mold includes an outer shell portion and a core portion, said cavity being provided in said core portion.

10. The method as claimed in claim 1, wherein said foaming mold includes a first portion and a second portion, said cavity being provided entirely in said second portion.

* * * * *